United States Patent [19]

Hoefle

[11] Patent Number: 5,368,118
[45] Date of Patent: Nov. 29, 1994

[54] TORSION BAR SUSPENSION FOR OPERATOR'S PLATFORM

[75] Inventor: Joerg J. Hoefle, Jugenheim, Germany

[73] Assignee: Deere & Company, Moline, Ill.

[21] Appl. No.: 115,938

[22] Filed: Sep. 2, 1993

[51] Int. Cl.[5] ................... B62D 33/063; B62D 49/00
[52] U.S. Cl. .................. 180/89.12; 180/89.13; 296/190; 296/35.1
[58] Field of Search .............. 180/89.12, 89.13, 89.14, 180/89.15, 89.16; 296/190, 35.1

[56] References Cited

U.S. PATENT DOCUMENTS

| | | | |
|---|---|---|---|
| 2,708,133 | 5/1955 | Sewelin et al. | 296/35.1 |
| 3,059,958 | 10/1962 | Lindblom | 296/35.1 |
| 3,381,995 | 5/1968 | Carter | 296/35.1 |
| 3,667,565 | 6/1972 | Steiner et al. | 296/35.1 |
| 3,882,956 | 5/1975 | Plegat | 180/89.14 |
| 3,944,017 | 3/1976 | Foster | 180/89.15 |
| 3,948,341 | 4/1976 | Foster | 180/89.15 |
| 4,460,168 | 7/1984 | Obadal | 267/140.11 |
| 4,600,236 | 7/1986 | Weiss et al. | 180/89.12 |

FOREIGN PATENT DOCUMENTS

| | | | |
|---|---|---|---|
| 0273796 | 12/1990 | European Pat. Off. | 296/190 |
| 2097332 | 3/1972 | France . | |
| 2483979 | 12/1981 | France . | |
| 1555826 | 10/1970 | Germany . | |
| 2161953 | 6/1973 | Germany . | |
| 2548749 | 6/1976 | Germany . | |
| 7911488 | 4/1979 | Germany . | |
| 2801261 | 7/1979 | Germany . | |
| 3007074 | 9/1981 | Germany | 180/89.15 |
| 3218871 | 3/1984 | Germany . | |
| 3813555 | 11/1989 | Germany | 180/89.14 |
| 0128972 | 8/1983 | Japan | 296/190 |
| 0241280 | 10/1986 | Japan | 296/190 |
| 929171 | 6/1963 | United Kingdom . | |
| 1419796 | 12/1975 | United Kingdom | 180/89.15 |
| 1468785 | 3/1977 | United Kingdom . | |
| 2244745 | 12/1991 | United Kingdom | 296/190 |

Primary Examiner—Kenneth R. Rice
Assistant Examiner—Peter C. English

[57] ABSTRACT

A suspension for the operator's platform of agricultural or industrial vehicles uncouples the platform from vibrations of the vehicle chassis, in particular vertical vibrations acting in the vehicle's fore-and-aft plane. To do this, at least one essentially horizontally and laterally aligned torsion rod is fixed with its ends between the platform and a first end of a pair of links. The second end of each link is pivotally mounted to the vehicle chassis, with the pivot axis parallel to the torsion rod axis. The torsion rod is supported in the vehicle platform by a bearing which is close to the link.

12 Claims, 6 Drawing Sheets

TORSION BAR SUSPENSION FOR OPERATOR'S PLATFORM

BACKGROUND OF THE INVENTION

1. Field of the Invention

The invention concerns a suspension system for the operator's platform of agricultural or industrial vehicles.

2. Description of the Related Art

On slow-moving vehicles such as agricultural tractors and the like, the operator's platform on which an operator's cab or a four-column roll-over structure may be mounted usually is not supported on springs, but is attached with bumpers or rubber mounts to the vehicle body. Due to their small spring deflection, these mounts provide isolation of structure-borne noise, but do not provide significant elastic support for the operator's platform. Low-frequency mechanical vibrations generated by operation over rough terrain can be transmitted right through them to the attachment point of the operator's seat, without any damping. To assure at least a certain degree of comfort for the operator, the vertical, horizontal, transverse and pitch vibrations typically are absorbed by spring-mounting the operator's seat.

For ergonomic reasons, the spring support of the operator's seat should not be too soft, since this would increase the spring deflections and lead to comparatively large relative motion between the operating controls and the operator. If this happened during shock loads, the operator might lose contact with the operating controls and adjusting levers mounted on the operator's platform. Unfortunately, these limitations on vibration isolation lead to a spring support for the seat whose resonant frequency may lie in the range of natural frequencies of several internal human organs, which is perceived as being uncomfortable. The spring support of the seat also does not prevent transmission of vibrations through operating controls mounted on the operator's platform.

EP-B1-0 273 796 describes an elastic support for the cab of an agricultural tractor, in which MacPherson struts are provided to absorb vibrations between a stiff chassis on the one hand and transverse structures connected to the cab on the other. This elastic support permits pitch vibrations about the transverse axis that give the operator an impression of tumbling motion, which may impair his control of the vehicle. The known arrangement requires a multitude of Panhard rods to absorb horizontal forces and is relatively costly. Furthermore, tuning of the elastic supports is difficult.

SUMMARY OF THE INVENTION

The object of the present invention is to provide a suspension for an operator's platform that largely decouples the operator's platform from vibrations of the vehicle chassis while avoiding the difficulties noted above. The vibrations in the vertical longitudinal plane of the vehicle, in particular, are to be isolated by elastic supports while transverse forces are absorbed with relatively high stiffness.

This object is achieved according to the invention by mounting the operator's platform with several longitudinal links. Generally horizontal torsion bars, oriented transverse to the direction of travel, then are clamped fixed against rotation between the operator's platform and the first end of each longitudinal link. The clamping is performed by fixed bearings. In particular cases the fixed bearings may appropriately be replaced by shock mount bearings. The second end of each longitudinal link is pivotally mounted to the vehicle chassis with its pivot axis oriented parallel to the torsion bar. The longitudinal links can be attached through a mount or the like, for example, to a vehicle frame, a gearbox housing or an axle housing. The torsion bar, clamped at both ends, is stiff against torsion and bending forces and is loaded in torsion.

This application of longitudinal links limits the number of degrees of freedom of the operator's platform to a plane of motion oriented vertically in the longitudinal axis of the tractor. Depending on the angular position of the links, vertical and horizontal pitching vibrations, as well as pitching vibrations oriented in the direction of travel, can be absorbed. Isolation of the transverse vibrations is largely omitted in view of their aforementioned disadvantages.

Supplementary measures may be taken against vibrations in the lateral direction, that is, for transverse vibrations. In addition to supporting the operator's platform with bumpers, horizontal and lateral seat support springs are appropriate. The introduction of such additional degrees of freedom preferably is consciously limited to assure that sufficient motion from the vehicle reaches the operator for the operator to recognize the vehicle's operating behavior and to avoid kinesia (motion sickness or seasickness), which is traced primarily to transverse and roll vibrations.

A symmetrical support of the operator's platform is provided most appropriately by an equal number of longitudinal links pivotally connected on both sides of the operator's platform, each of which carries an associated torsion bar. The torsion bars are arranged parallel to each other. Torsion bars associated with two longitudinal links located generally opposite each other are aligned with each other or are at least located close to each other in space.

Preferably, each longitudinal side of the operator's platform is provided with a forward and a rear longitudinal link each of which carries a torsion bar. For the support of heavier operator's platforms with a superstructure, more than four longitudinal links with the associated torsion bars may also be appropriate.

If the front and rear links are at an angle with respect to each other, then a virtual axis is defined by the intersection of the extension of the axes of the front and the rear links, and represents a virtual pivot axis for the operator's platform. When the longitudinal links are parallel, of equal length and located one behind the other, the virtual axis is located at infinity. The result is that of an infinitely long pendulum. This arrangement forces the tractor cab essentially into the motion of a parallelogram suspension.

By orienting longitudinal links situated behind each other so as not to be parallel and/or by the application of longitudinal links of different lengths, the virtual axis can be positioned at a specific location. It can be oriented near the horizontal plane of the center of gravity of the operator's platform, if necessary including the cab superstructure, which results in relatively neutral behavior under horizontal inertial forces that occur during braking and acceleration. The application of longitudinal links of different lengths leads to a superposition of translational and pitch vibrations, moving the position of the virtual axis from its rest position.

Preferably the direction of the longitudinal link, more precisely, the line connecting the clamping point of the torsion bar and the pivot axis, is at an angle between 0° and 30° to the horizontal. The static spring deflection is determined by the position assumed at rest without any dynamic effects. The angle at which the longitudinal links are inclined upward or downward and the selection of the forward or rear end of the longitudinal links for the connection to the pivot on the vehicle chassis depends on the total requirements.

When the longitudinal links are flat, the operator's platform moves almost exclusively in the vertical direction under the effect of vibrations, while with longitudinal links other than horizontal the vertical motion is superimposed on a motion in the longitudinal direction of the vehicle.

According to a preferred embodiment of the invention, the axis of the torsion bar is supported in the vicinity of its clamping point on the longitudinal link in a bearing on the operator's platform that permits rotation of the torsion bar. This bearing supports the torsion bar on the operator's platform. The bearing may be a sliding bearing.

The arrangement of the torsion bars may follow several preferred principles in which the operator's platform is provided with two frame members at the sides oriented in the direction of travel, and the bearings supporting the torsion bars are each located in one of the side frame members.

According to a first arrangement, the end of each torsion bar is fixed against rotation to the side frame member which is opposite the side frame member at which its bearing and its associated longitudinal link are arranged. Here the torsion bars are arranged close together, one pair behind the other.

In a second arrangement, the ends of each torsion bar are clamped in two longitudinal links on opposite sides of the operator's platform, and are supported in the side frame members of the operator's platform. The middle of the torsion bar then is clamped in a center frame member of the operator's platform. Alternatively, in place of the long one-piece torsion bar clamped in the center, two shorter separate torsion bars could be employed that are clamped to the center frame member.

A further arrangement has each torsion bar extend through an associated torsion tube, with the torsion tube clamped at its one end to the frame member and at its other end to the torsion bar. The torsion bar and the torsion tube are concentric to each other and are supported at the center of the operator's platform. The end of the torsion bar extending to the side from the end of the torsion tube is clamped to the associated longitudinal link. The spring rates of the torsion bar and the torsion tube are arranged in series. The total spring characteristic may be modified over a wide range by the design of each spring component.

If transverse or rolling motions are to be freed, then degrees of freedom in the transverse direction must be permitted. To absorb the resulting transverse forces, preferably a further torsion bar is provided directed generally horizontally and transverse to the direction of travel and rigidly clamped between the first ends of two longitudinal links arranged on opposite sides of the operator's platform. Each of the second ends of the longitudinal links can pivot about an axis in the vehicle chassis parallel to the axis of the torsion bar. Furthermore the axis of the torsion bar is supported in bearings on the operator's platform in the vicinity of each of the two longitudinal links.

By means of this connection of two longitudinal links located on the transverse opposite sides of the direction of travel through a torsion bar supported on the operator's platform, transverse forces can be absorbed elastically. This results in a stabilizing effect.

Furthermore there is an advantage in providing a Panhard rod extending generally transverse to the direction of travel that is arranged between the operator's platform and the vehicle chassis. The Panhard rod is loaded only by tensile and compression forces. Preferably it is located in the plane of the center of gravity under the operator's platform and absorbs transverse loads during rolling motions, so as to avoid a lateral excursion of the operator's platform.

The free bearing between the longitudinal link and the vehicle chassis performs a support function and permits pivoting of the longitudinal link with respect to the vehicle chassis. Rubber-metal isolators preferably are applied to absorb structure-borne noise. Preferably such silencing devices are provided at the lower attaching point of the longitudinal links on the chassis side. The rubber bearing can be tuned for a guided although small lateral deflection to absorb transverse forces elastically.

The stiffness of the silencing devices should be selected with respect to its pivot axis in the axial and radial directions depending on their configuration. For this purpose an integrated solution is preferably used with rubber guides vulcanized onto the longitudinal links or a link bearing with flange blocks clamped against each other.

To limit the relative motion between the operator's platform and the vehicle chassis, end stops are preferably provided, for example, rubber or elastomeric bumpers. The end stops may be attached to the longitudinal links. The bumper action can be enhanced by utilizing the lever ratios of the longitudinal links. With their help a progressive spring characteristic can be attained over a larger area.

Dampers are preferably arranged between the operator's platform and the vehicle chassis, located to each side of the operator's platform in the plane of its center of gravity. The dampers may appropriately be shock absorbers common in motor vehicle practice. The restrained kinematic guidance of the longitudinal links permits a reduction in the number of dampers in comparison to conventional operator's platform suspensions.

The rigid clamp connections between the torsion bars and the operator's platform or the longitudinal links are preferably designed so that they can be unclamped. After releasing the clamps, the operator's platform may be raised by pivoting the longitudinal links pivot to their zenith. The raised operator's platform permits access to vehicle components located underneath and makes service operations easier. For reasons of safety, before operations are performed under the operator's platform it should be secured against undesired lowering.

The operator's platform may be raised by a vehicle jack or other means. For this purpose a power source may be used that is already available on the vehicle whose power is transmitted by a transmission linkage or the like to the operator's platform.

BRIEF DESCRIPTION OF THE DRAWINGS

The invention will be described further with reference to the following drawings, in which.

DETAILED DESCRIPTION OF THE PREFERRED EMBODIMENTS

Figure 1:
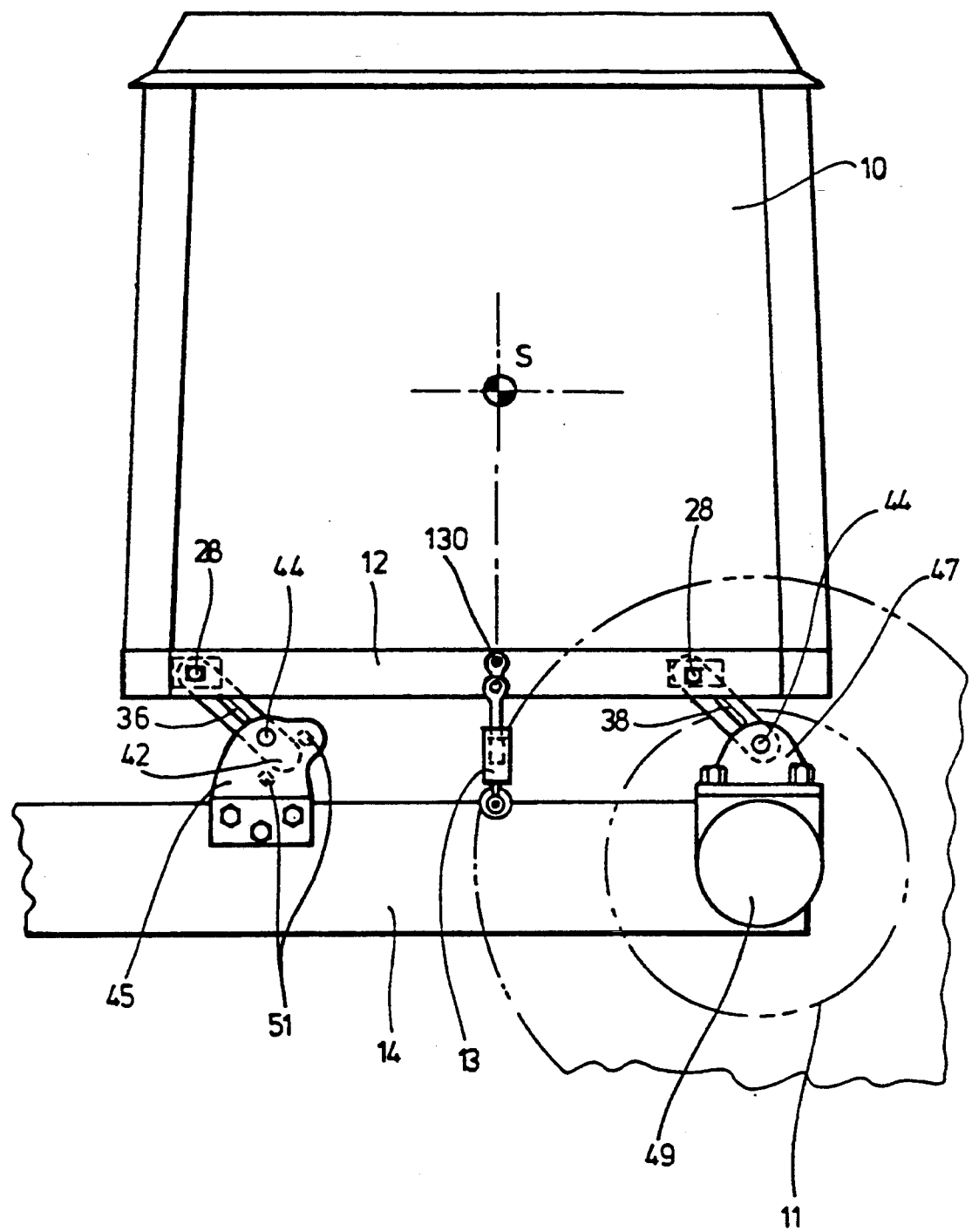
FIG. 1 is a schematic side view of a suspension according to the invention of an operator's cab on the chassis of an agricultural tractor.

FIG. 1 schematically illustrates the rear wheel 11 of a vehicle that carries an agricultural tractor substructure, designated vehicle chassis 14. Above the vehicle chassis 14 there is an operator's platform 12 upon which a cab 10 is mounted. The vehicle chassis 14 and the operator's platform 12 are connected by front and rear longitudinal links 36, 38 and dampers 13 arranged on each side of the cab. Furthermore FIG. 1 indicates the position of a Panhard rod 130 which lies, along with the dampers 13, in a vertical plane transverse to the direction of travel and that includes the center of gravity S of the cab 10.

The front longitudinal links 36 can be supported through mounts 45 on the vehicle chassis or a gearbox housing, and the rear longitudinal links 38 can be supported through mounts 47 on the axle housings 49 of the agricultural tractor. On the sides of the front mounts alongside the extended second ends 42 of the front longitudinal links 36, rubber blocks 51 are attached which are used as stops and limit the pivoting path of the front longitudinal links 36.

A first pair of links 36, 38 are mounted on one side of the cab frame 12 and a second pair of links 36, 38 are mounted on another side of the cab frame 12. The first pair of links includes a first front link 36 positioned in front of a first rear link 38 with respect to the direction of travel. The second pair of links includes a second front link 36 positioned in front of a second rear link 38 with respect to the direction of travel. The links 36 and 38 extend in a generally vertical plane oriented in a longitudinal direction of the vehicle. Each link 36, 38 has a first end which is pivotally coupled to the chassis 14 about a pivot axis which is oriented generally in a horizontal direction and transverse to a travel direction of the vehicle, and each link 36, 38 has a second end which is pivotally coupled to the cab frame 12 about a pivot axis which is oriented generally in a horizontal direction and transverse to a travel direction of the vehicle.

Each front link 36 may be inclined at an angle with respect to the corresponding rear link 38. If so, then the first rear link 38 and the first front link 36 have center lines which intersect at a first point (not shown), the second rear link 38 and the second front link 36 have center lines which intersect at a second point (not shown), and the first and second points will define a virtual axis which is transverse to the direction of travel.

By orienting longitudinal links situated behind each other so as not to be parallel and/or by the application of longitudinal links of different lengths, the virtual axis center can be positioned at a specific location. It can be oriented near the horizontal plane of the center of gravity S of the operator's platform, if necessary including the cab superstructure, which results in relatively neutral behavior under horizontal inertial forces that occur during braking and acceleration.

The floor structure of the operator's platform 12 is indicated in plan view in FIGS. 2 through 5, in which corresponding components are designated by the same part number call-outs. It forms a frame structure and generally includes four tube-shaped supports arranged at right angles to each other, that is, two side frame members 16, 18, a front frame member 20 and a rear frame member 22. The side frame members 16, 18 are perforated with holes. Bearings 24 are inserted into the holes and accept torsion bars 26, 28, 30, 32 (see FIGS. 2, 3, 4, 5, respectively). The bearings 24, not shown in greater detail, support the torsion bars 26, 28, 30, 32 relative to the operator's platform 12, but permit rotation of the torsion bars 26, 28, 30, 32.

The end of each torsion bar 26, 28, 30, 32 projecting outward beyond the bearing 24 is clamped by fixed bearings to prevent rotation or by other means in the corresponding first end 34 of each longitudinal link 36, 38, which is rigid against torsional and bending forces. An isolating bearing can be employed in particular cases in place of the fixed bearing 40. The other, second end 42 of each longitudinal link 36, 38 is connected through a free bearing in mounts 45, 47. The free bearing (discussed in detail in connection with FIGS. 6–8 below) permits pivoting of the longitudinal links 36, 38 about a pivot axis 44 oriented parallel to the axis of the torsion bars.

The ends of the torsion bars 26, 28, 30, 32 opposite the ends clamped in the fixed bearing 40 of the longitudinal links 36, 38 are attached by differing means, as shown in each of FIGS. 2 through 5.

Figure 2:
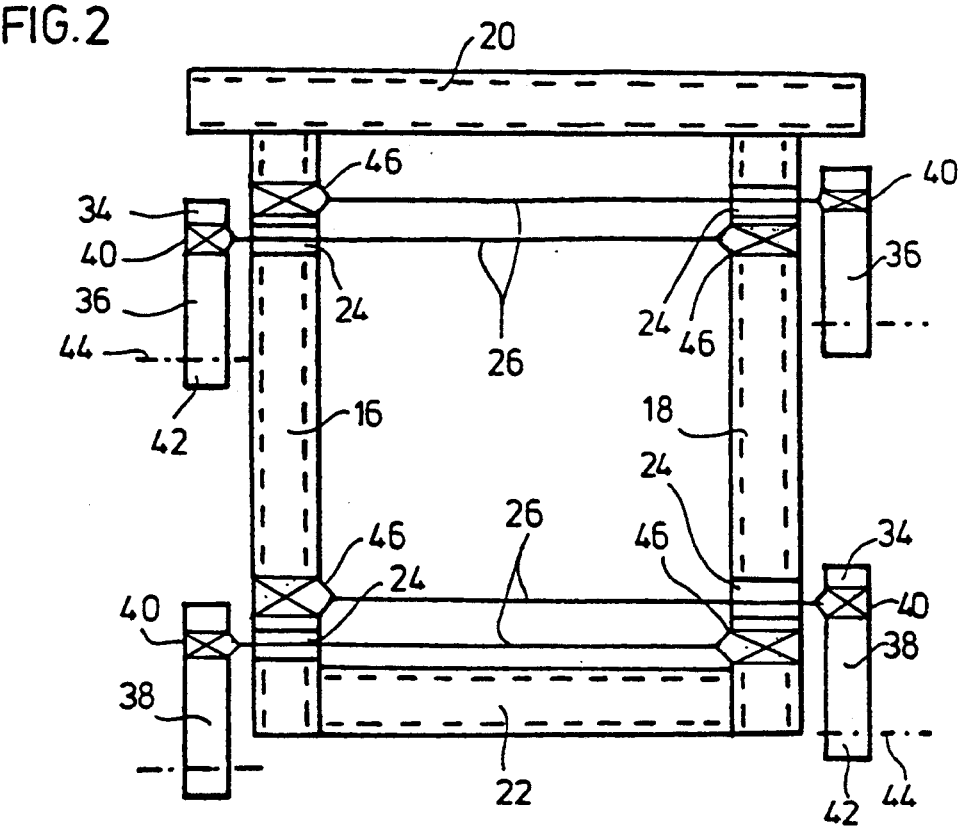
FIGS. 2 through 5 show several variations of the torsion bar arrangements of a suspension according to the invention.

In the embodiment of FIG. 2, the other end of each torsion bar 26 is clamped in the corresponding opposite side frame member 16, 18 by a fixed bearing 46. In this variant four torsion bars 26 are used, with the two front bars and two rear bars located immediately adjacent to each other.

Figure 3:
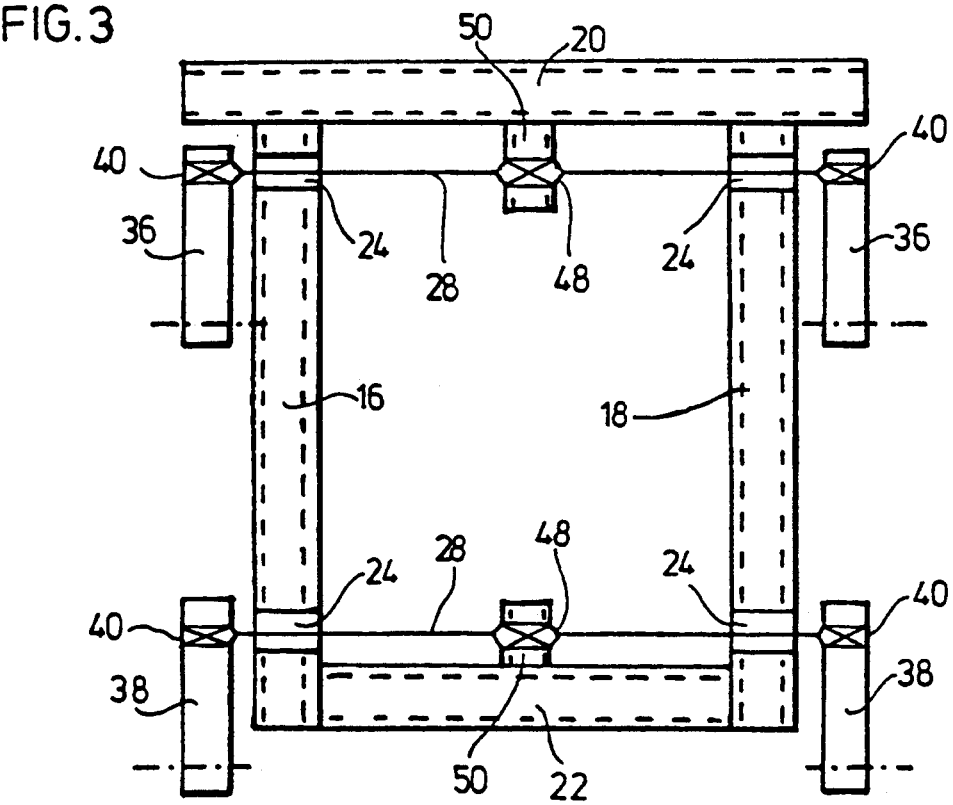

The embodiment of FIG. 3 uses only a single front and a single rear torsion bar 28. Each torsion bar 28 is clamped at both its ends in a fixed bearing 40 in the longitudinal links 36, 38 arranged on the outside of the side frame members 16, 18 and is supported in the bearings 24 in the side frame members 16, 18. The center region of each torsion bar 28 is clamped, fixed against rotation, in a fixed bearing 48 to a center frame member 50. Alternatively, each torsion bar 28 can be formed of two partial bars that are aligned with each other and are clamped in the center frame member 50.

Figure 4:
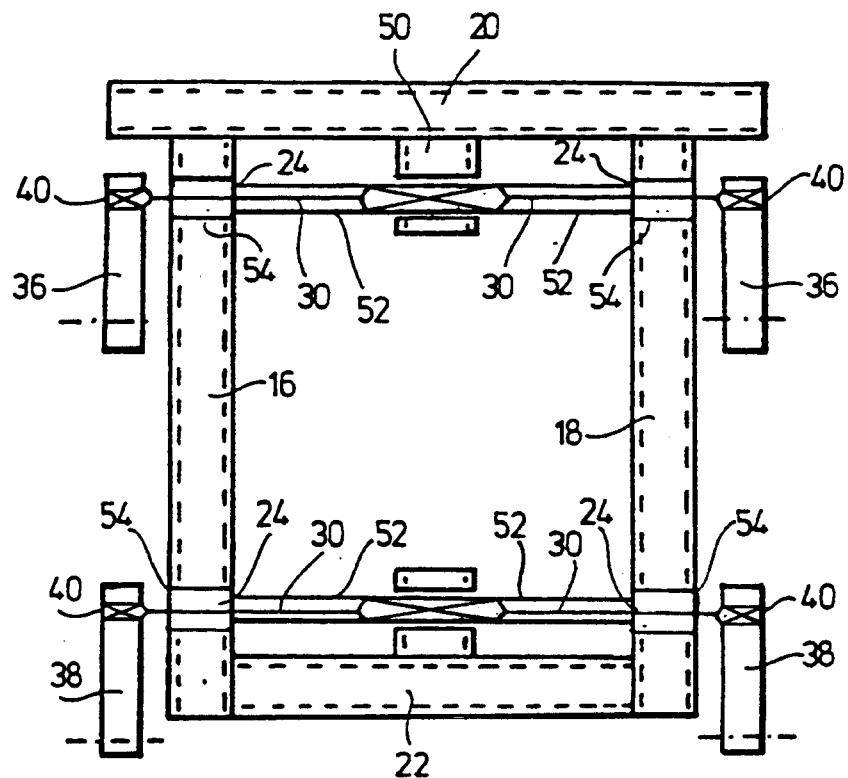

The embodiment of FIG. 4 uses two torsion tubes 52. Each tube is attached to side frame members 16, 18 by rigid connections 54 and extends into the interior of the frame. The free ends of the torsion tubes 52, directed toward the interior of the frame, are supported, free to rotate, in a center frame member 50. A torsion bar 30 extends concentrically within each torsion tube 52 and is clamped at its one end by a rigid connection 40 in the longitudinal links 36, 38 and at is other end is clamped, fixed against rotation, to the free end of the associated torsion tube 52.

Figure 5:
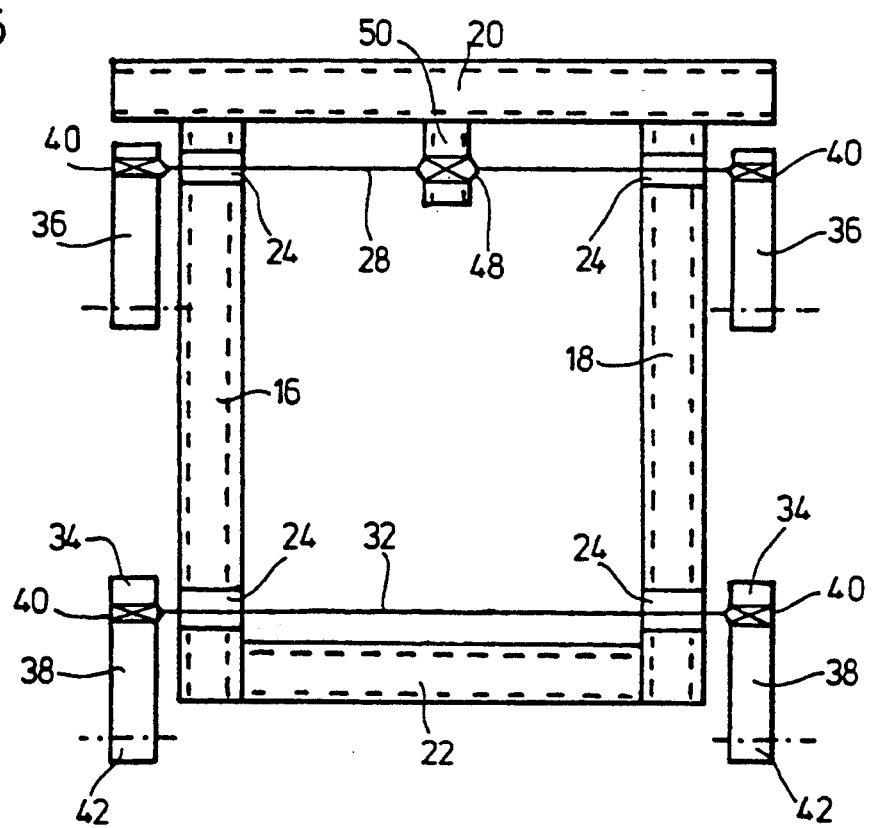

The embodiment of FIG. 5 uses a first, front torsion bar 28 clamped, fixed against rotation, as are the torsion bars 28 in FIG. 3, between the two outer longitudinal links 36 and a center frame member 50, while a second, rear torsion bar 32 is clamped only between the two outer longitudinal links 38. The first torsion bar 28 absorbs vertical forces. The second torsion bar 32 has a stabilizing effect and absorbs roll motions. The second torsion bar 32 may also be used in combination with one or more of the torsion bar arrangements shown in FIGS. 2 through 4.

In operation, motion will cause the longitudinal links 36, 38 to rotate about their pivot axes 44, producing an up and down movement of the operator's platform 12 with the attached operator's cab 10. This applies torsion to the torsion bars 26, 28, 30, 32 and the torsion tubes 52, if applicable, resulting in elastic support of the cab 10. In addition, if the operator's platform 12 is tilted to the side, the two rear longitudinal links 38 of FIG. 5 deflect to differing degrees against the force of the torsion bar 32. The torsional force in that embodiment therefore also provides a restoring force against sideways tilting.

Figure 6:
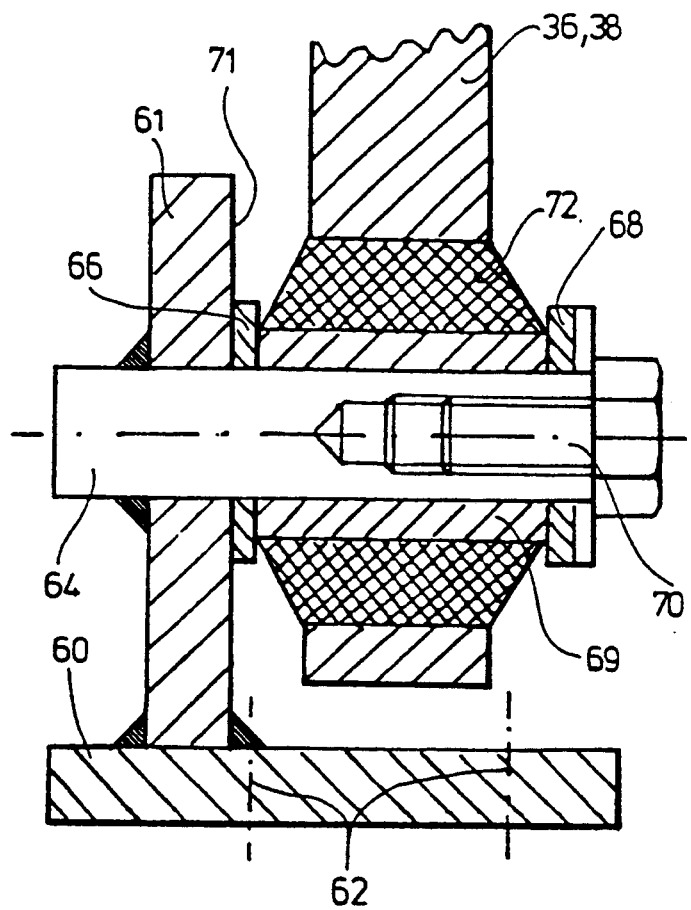
FIGS. 6 through 8 are cross sectional views of several variations of the pivot bearing of a suspension according to the invention.
Figure 7:
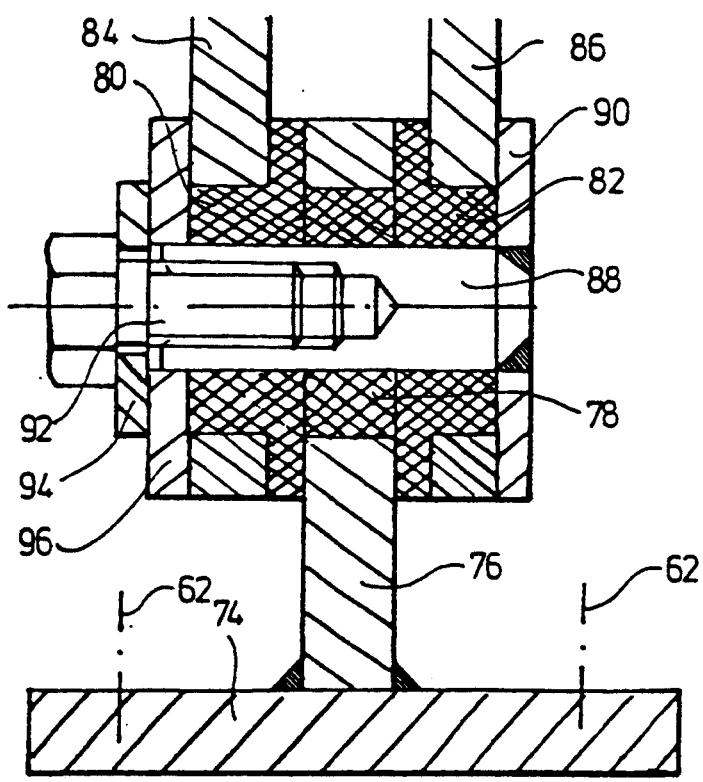
Figure 8:
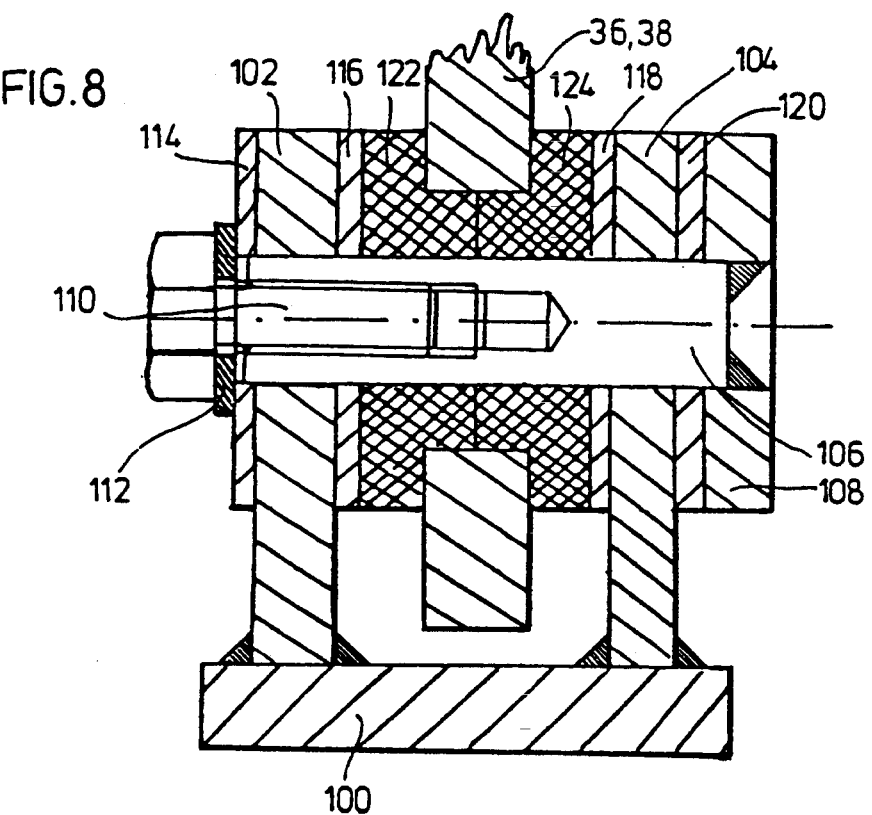

FIGS. 6 through 8 illustrate various embodiments of the mounts 45, 47.

FIG. 6 shows an L-shaped mount 60 which can be fastened to the vehicle frame or gearbox housing (not shown) by bolts 62 (of which only the centerlines are shown). A leg 61 extending vertically upward from the mount 60 has pivot pin 64 welded thereto. The pivot pin 64 carries two bearing washers 66, 68 and an intervening sleeve 69 which are clamped by a pin 70 against a side face 71 of the vertical leg 61. The outer surface of the sleeve 69 engages a rubber grommet 72 that is vulcanized to the longitudinal link 36, 38 and which can pivot between the bearing washers 66, 68 about the pin 64. The bearing support shown in FIG. 6 permits pivoting of the longitudinal links 36, 38 and can limited absorb roll vibrations between the vehicle chassis 14 and the operator's platform 12.

FIG. 7 shows a different variant for the bearing support. Here a T-shaped mount 74 can be fastened to the vehicle chassis 14 with bolts 62. The central leg 76, extending vertically upward from the mount 74, is provided with a bore that engages an elastic sleeve 78. Rubber flanges 80, 82 are arranged on each side of the sleeve 78. Each rubber flange 80, 82 carries a leg 84, 86 of a longitudinal link 36, 38 configured in two spans. A pin 88 extends through bores in the sleeve 78 and the rubber flanges 80, 82 and is provided on one side with a welded washer 90. The sleeve 78 and the rubber flanges 80, 82 are clamped by a pin 92 with a plain washer 94 between the welded washer 90 and a further washer 96. This bearing support also permits pivoting of the longitudinal link and absorbs limited roll vibrations.

The variant shown in FIG. 8 provides a U-shaped mount 100 with legs 102, 104 extending upward and provided with bores to engage a transverse pin 106. A washer 108 is welded to one end of the transverse pin 106. A bolt 110 is fastened at the end of the transverse pin 106 opposite the washer 108, and, together with a washer 112, clamps the two legs 102, 104 between the welded washer 108 and the washer 112. Bearing washers 114, 116, 118, 120 are arranged on each side of each leg 102, 104. Two elastic flange blocks 122, 124 are clamped between the center bearing washers 116, 118. A longitudinal link 36, 38 is clamped between and supported by the flange blocks 122, 124. The bearing washers 114, 116, 118, 120 reduce the friction of the longitudinal link 36, 38 pivoting about the pin 106. The bearing support according to FIG. 8 exhibits a high transmissibility for forces in the longitudinal direction of the links and a low transverse elasticity.

Figure 9:
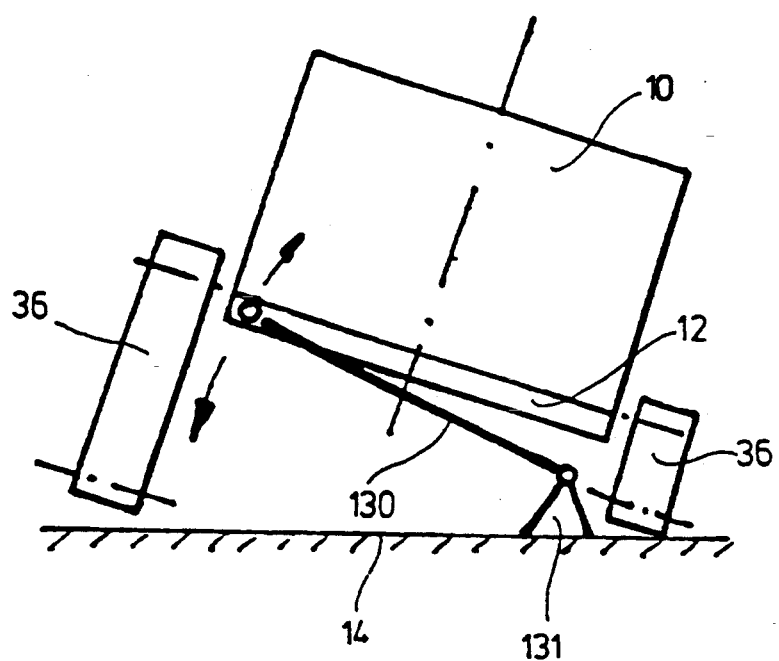
FIG. 9 illustrates the arrangement of a Panhard rod used with a suspension according to the invention.

During roll movement, transverse forces can be absorbed by a Panhard rod 130 which is loaded only by tensile and compression forces. The arrangement of the Panhard rod 130 is shown in FIG. 9, which represents a schematic partial view of the vehicle from the rear. A front longitudinal link 36 is provided on each side of the operator's platform 12, which carries the cab 10. As a result of the applied transverse forces the two longitudinal links 36 are deflected to differing degrees, so that they appear to have differing lengths when viewed from the rear. One end of the Panhard rod 130 is pivotally connected at one side of the operator's platform 12. Its other end is pivotally connected to the opposite side of the vehicle through a mount 131 to the vehicle chassis 14. The result is limitation of sideways movement in either direction.

If the clamps 40 that hold the torsion bars 26, 28, 30, 32 in the longitudinal links 36, 38 or the clamps 46, 48 between the torsion bars 26, 28, 30, 32 and the side or center frame members 16, 18, 50 are released, then the longitudinal links 36, 38 can be rotated about their pivot axes 42 and erected upward without applying any torsional loads to the torsion bars 26, 28, 30, 32 or, if applicable, to the torsion tubes 52. The operator's platform then can be raised to provide access to vehicle components located underneath the operator's platform 12.

Figure 10:
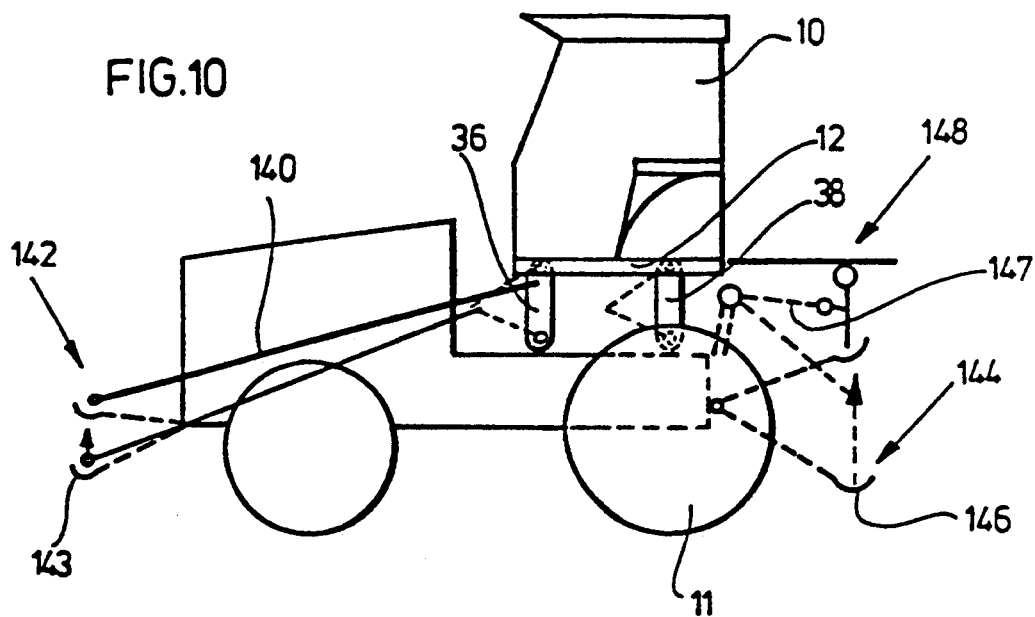
FIG. 10 is a schematic side view of an agricultural tractor with the cab raised.

The longitudinal links 36, 38 are shown erected vertically in FIG. 10. Rotation of the four longitudinal links 36, 38 and the raising of the operator's platform 12 can be performed through a linkage 140 by the remotely-controlled lifting arms 143 of a front hitch or other lifting arrangement 142 at the forward end of the vehicle, or lifting arrangement 148 actuated by a rear hitch or other lifting arrangement 144 with lower lifting arm 146 and upper lifting arm 147. One or both of such front and rear hitches are found on the typical tractor.

Figure 11:
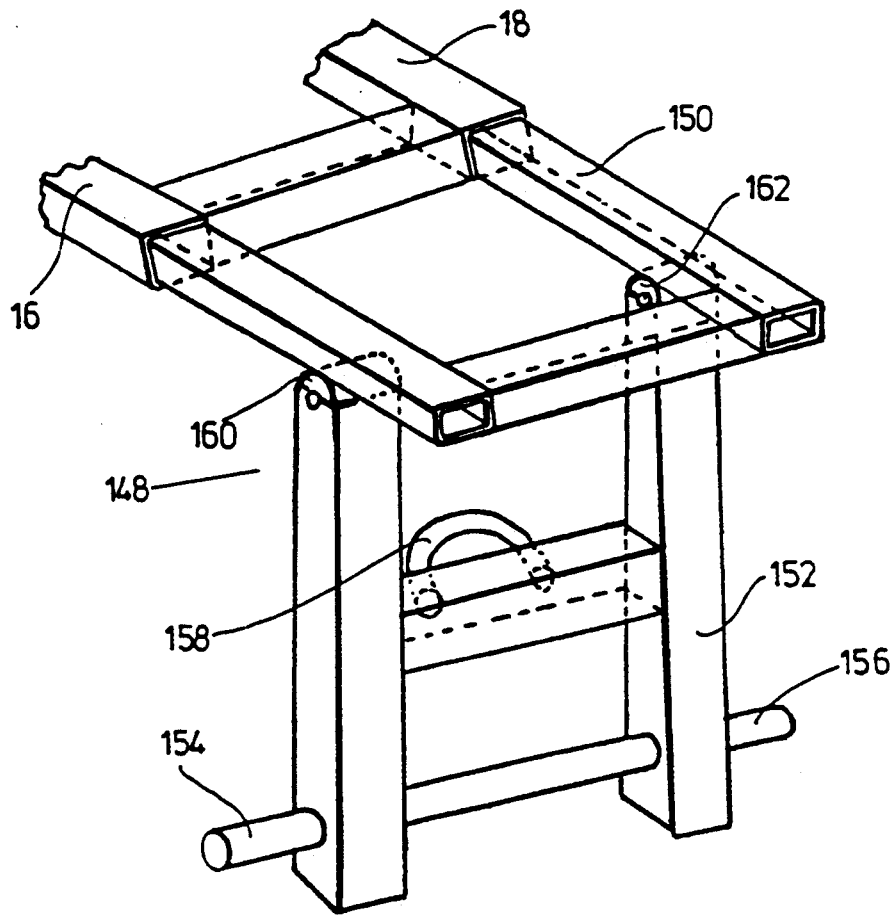
FIG. 11 shows a lifting arrangement for the cab.

FIG. 11 shows a specific embodiment of an appropriate lifting arrangement 148 for use with a conventional three-point hitch (not shown) having two lower lift arms 146 and one upper lift arm 147. A first auxiliary frame 150 can be inserted into rearward-facing openings of the tube-shaped side frame members 16, 18 of the operator's platform 12. A second auxiliary frame 152 supports the first auxiliary frame 150 and transmits the lifting motion of the lifting arms 146, 147 to the first auxiliary frame 150 and thereby also to the operator's platform 12. The second auxiliary frame 152 is provided with outwardly extending support shanks 154, 156 by which it is supported on the two lower lifting arms 146. The upper lifting arm 147 is hooked into an eye 158 in the second auxiliary frame 152. On its upper end, the second auxiliary frame 152 carries two cylindrical rolls 160, 162 to equalize relative horizontal motions.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A suspension for an operator's platform of a vehicle, comprising:

an operator's platform;

a vehicle chassis;

a pair of links, each link having a first end and a second end;

mount means for pivotally mounting the first end of each link to the vehicle chassis;

a pair of transversely oriented torsion bars; fixed bearing means for non-rotatably fixing an end of each of the torsion bars to the second end of a corresponding one of the links; and support means for supporting said operator's platform on the torsion bars, the support means including clamp means for non-rotatably clamping a portion of each torsion bar to the operator's platform.

2. The suspension of claim 1, wherein said mount means allows limited transverse movement of said links.

3. The suspension of claim 1, wherein:

an other end of each of the torsion bars is fixed to said operator's platform by said clamp means.

4. A suspension for an operator's platform of a vehicle, comprising:

an operator's platform;

a vehicle chassis;

a pair of links, each link having a first end and a second end;

mount means for pivotally mounting the first end of each link to the vehicle chassis;

a transversely oriented torsion bar, the torsion bar having two ends and a middle;

fixed bearing means for non-rotatably fixing the ends of the torsion bar to the second ends of the links; and clamp means for non-rotatably clamping said middle of said torsion bar to said operator's platform.

5. The suspension of claim 4, further comprising:

a further pair of links coupled to the vehicle chassis; and a further torsion bar, the further torsion bar being non-rotatably coupled to the further pair of links and to the operator's platform.

6. The suspension of claim 4, further comprising:

a second pair of links pivotally coupled to the chassis, each link of the second pair having a first end and a second end; and a second torsion bar fixed between the second ends of the second pair of links, the second torsion bar is free to rotate with respect to said operator's platform.

7. The suspension of claim 4, wherein:

at least one of the clamping means and the fixed bearing means is selectively releasable to allow the links to be freely pivoted to a full, upright position.

8. The suspension of claim 7, further comprising:

a lift means for raising the operator's platform when said at least one of said clamping means and said fixed bearing means is released.

9. A suspension for an operator's platform of a vehicle, comprising:

an operator's platform;

a vehicle chassis;

four links, each link having a first end and a second end;

mount means for pivotally mounting the first end of each link to the vehicle chassis;

four transversely oriented torsion bars;

fixed bearing means for non-rotatably fixing an end of each of the torsion bars to the second end of a corresponding one of the links;

support means for supporting said operator's platform on the torsion bars; and clamp means for non-rotatably clamping an other end of each torsion bar to the operator's platform.

10. The suspension of claim 9, wherein:

a first pair of said four links are of a different length than a second pair of said four links.

11. A suspension for an operator's platform of a vehicle, comprising:

an operator's platform;

a vehicle chassis;

a pair of links, each link having a first end and a second end;

mount means for pivotally mounting the first end of each link to the vehicle chassis;

a pair of transversely oriented torsion bars, each torsion bar having a first end non-rotatably fixed to a second end of a corresponding one of the links and each torsion bar having a second end;

a pair of torsion tubes, each of the pair of torsion tubes having a first end non-rotatably fixed to the operator's platform and a second end free to rotate relative to said operator's platform, the second end of each torsion bar being non-rotatably fixed to the second end of a corresponding one of the torsion tubes; and support means for supporting said operator's platform on the torsion tubes.

12. The suspension of claim 11, further comprising:

a further pair of links, each of the further pair of links having a first end pivotally coupled to the vehicle chassis and having a second end;

a further pair of torsion bars;

a further pair of torsion tubes, each of the further pair of torsion tubes having a first end non-rotatably fixed to the operator's platform and a second end free to rotate relative to said operator's platform, and each of the further pair of torsion bars having a first end non-rotatably fixed to the second end of a corresponding one of the further links, and each of the further pair of torsion bars having a second end non-rotatably fixed to the second end of a corresponding one of the further pair of torsion tubes.

* * * * *